United States Patent [19]

Higuchi et al.

[11] 4,232,363
[45] Nov. 4, 1980

[54] AC TO DC CONVERTER WITH ENHANCED BUCK/BOOST REGULATION

[75] Inventors: Hobart A. Higuchi; Sammy K. Yee, both of San Jose, Calif.

[73] Assignee: International Business Machines Corporation, Armonk, N.Y.

[21] Appl. No.: 965,828

[22] Filed: Dec. 4, 1978

[51] Int. Cl.³ ..................... H02P 13/04; H02P 13/26
[52] U.S. Cl. ....................................... 363/75; 363/90; 363/101
[58] Field of Search ................. 363/46, 75, 77, 84, 363/90, 101, 93; 323/45, 60

[56] References Cited

U.S. PATENT DOCUMENTS

| | | | |
|---|---|---|---|
| 3,065,399 | 11/1962 | McNamee | 363/90 |
| 3,525,035 | 8/1970 | Kakalec | 323/61 |
| 3,761,797 | 9/1973 | Spooner | 323/45 X |
| 3,824,449 | 5/1973 | Hase | 323/45 X |
| 3,894,280 | 7/1975 | Bishop et al. | 323/60 X |
| 4,001,665 | 1/1977 | Wisner et al. | 323/45 X |
| 4,030,025 | 6/1977 | Kakalec | 323/61 |
| 4,068,157 | 1/1978 | Bassett | 363/75 |
| 4,150,423 | 4/1979 | Boschert | 363/90 |

FOREIGN PATENT DOCUMENTS 2014348 10/1971 Fed. Rep. of Germany .............. 363/75
2509591 9/1976 Fed. Rep. of Germany .............. 363/75

Primary Examiner—William H. Beha, Jr.
Attorney, Agent, or Firm—George E. Roush

[57] ABSTRACT

This closed loop potential regulated ac-dc power supply comprises a power transformer having two secondary windings and a compensating transformer having two compensating windings connected individually in series circuit with the principal power supply secondary windings. The other secondary windings on the power transformer supply exciting windings for compensating variations in output potential by control of the compensating transformer control circuitry which has an input circuit connected across the load and an output for varying the ac supply to the exciting windings inversely of variations in load potential. A differential amplifying circuit is used for determining the load potential error and driving a transistor effectively to insert a dc component in inverse feedback relationship into the exciting windings of the compensating transformer. As the output potential error increases, the control current is decreased, and conversely. The change in control current flow is enhanced in that the transistor responds immediately to the change in the output potential and additionally by the operation of the differential amplifying circuit.

21 Claims, 4 Drawing Figures

AC TO DC CONVERTER WITH ENHANCED BUCK/BOOST REGULATION

FIELD

The invention relates to direct current power supply circuit arrangements supplied from alternating current sources, particularly those regulated power supply circuits employing a ferroresonant transformer and automatic regulating circuitry, and it more particularly pertains to such power supply circuit arrangements having very low loss and high efficiency.

BACKGROUND

Direct current power supplies drawing primary energy from alternating current sources have been known for half a century. Such electric power supplies were first equipped with automatic regulating circuitry about forty years ago. Much work has been done in improving the regulation and in increasing the current regulated until the art is replete with excellent potential and/or current regulating circuitry. For a time, any loss due to the regulating circuitry was considered well spent. Much more recently, however, the attention of those skilled in the art has turned to reducing the loss brought about by the regulating circuitry to a very low minimum and, of course, conversely increasing the efficiency.

PRIOR ART

Prior art circuitry of interest in connection with the circuit arrangements according to the invention to be described hereinafter, comprise those power supply circuit arrangements employing ferroresonant transformers, automatic negative feedback regulating circuitry, and alternating current compensating circuit arrangements. Circuitry pertinent in this connection is to be found in the following U.S. patents:

| 3,525,035 | 8/1970 | Kakalec | 323/61 |
| 3,824,449 | 7/1974 | Hase | 323/6 |
| 3,761,797 | 9/1973 | Spooner | 363/46 |
| 3,894,280 | 7/1975 | Bishop et al | 363/25 |
| 4,001,665 | 1/1977 | Wisner et al | 363/93 |
| 4,030,025 | 6/1977 | Kakalec | 323/61 |

The patents to Kakalec are directed to ac to dc electric power supplies employing ferroresonant transformers and automatic regulating circuitry for controlling core saturation and/or waveform of the potentials induced in the transformer by arrangements other than arrangements for compensating and controlling the compensating of the ac power delivered by the transformer to the rectifier assembly.

The patents to Hase and to Bishop and Kerenyi are directed to circuit arrangements responsive to the dc load on the power supply for regulating the power supplied thereto by varying the degree of saturation of the transformer core. The arrangement of Hase employs a saturable reactor or a magnetic amplifier shunted across a part of the ferroresonant transformer winding, while the arrangements to Bishop and Kerenyi vary the frequency of the input alternating current supply, which in the example given, is a dc-ac inverting circuit.

Spooner, in his patent, shows a ripple filter circuit arrangement, which has some similarity in circuit configuration to the compensating circuitry of the invention, but which is arranged only to vary the magnetic flux in the core of an otherwise conventional filter choke in such manner as to reduce the ripple effectively.

The closest art of which the Applicant is aware is the patent to Wisner et al which shows a circuit arrangement having several features as auxiliary windings and control circuitry which are at least superficially similar to those in the circuit arrangement according to the invention. The principal differences are found in that this prior art power supply arrangement is a slowly responding control circuit because of ac averaging, uses auxiliary windings in a bucking mode only, with interaction with the ferroresonant tank circuit for control of the bucking and with the control circuit dissipating considerable energy because of the circuit configuration.

SUMMARY

Objects of the invention indirectly referred to hereinbefore and those that will appear as the specification progresses are attained in a closed loop potential regulated power supply circuit arrangement comprising an electric power supply transformer having two sets of secondary windings and a compensating transformer having exciting windings and two compensating windings, with the compensating windings individually connected in series circuit with the principal power supply secondary windings and a full wave rectifier circuit to the output of which an electric load is connected. The exciting windings of the compensating transformer have ac potential applied thereto from the other secondary windings on the power transformer which also supply dc power by means of another full wave rectifying circuit for the compensating control circuitry which has an input circuit connected across the load to sense potential variations thereat and an output for varying the ac supply to the exciting windings in inverse relationship to variations in load potential with the direct current flow path being completed through the load whereby little or no energy is dissipated elsewhere.

There is nothing to preclude the use of ferroresonant transformers in the circuit arrangement according to the invention, and indeed the circuit arrangement according to the invention is advantageous in that a ferroresonant transformer is tuned to optimum performance independently of the regulating circuitry according to the invention.

The control circuitry is arranged and simplified as much as possible in order to reduce power dissipation. A differential amplifying circuit is used as a comparator for determining the degree of variation in potential across the load with respect to a reference potential, such as is obtained by means of a zener diode. The error signal produced at the output of the differential amplifier circuit is applied to the base electrode of the series circuit transistor. The error signal, in terms of potential is converted to resistance in the control transistor which is effective to insert a dc component into the exciting winding of the supply transformer. This dc component is applied in inverse feedback relationship whereby as the output potential of the power supply is increased, the input potential to the rectifier assembly is decreased, and the converse. The control is substantially linear through a range beginning with a condition of boosting, through a crossover condition of balance or zero compensation, and thence through a condition of bucking compensating potential. Once the circuit arrangement is functioning, the tendency is toward minute variation of compensation around balance. The full range of boosting through and bucking lends stability to the operation of the circuit arrangement.

DRAWING

In order that full advantage of the invention obtain in practice, a best mode embodiment thereof, given by way of example only, is described in detail hereinafter, with reference to the accompanying drawing, forming a part of the specification, in which.

DESCRIPTION OF EMBODIMENTS

Figure 1:
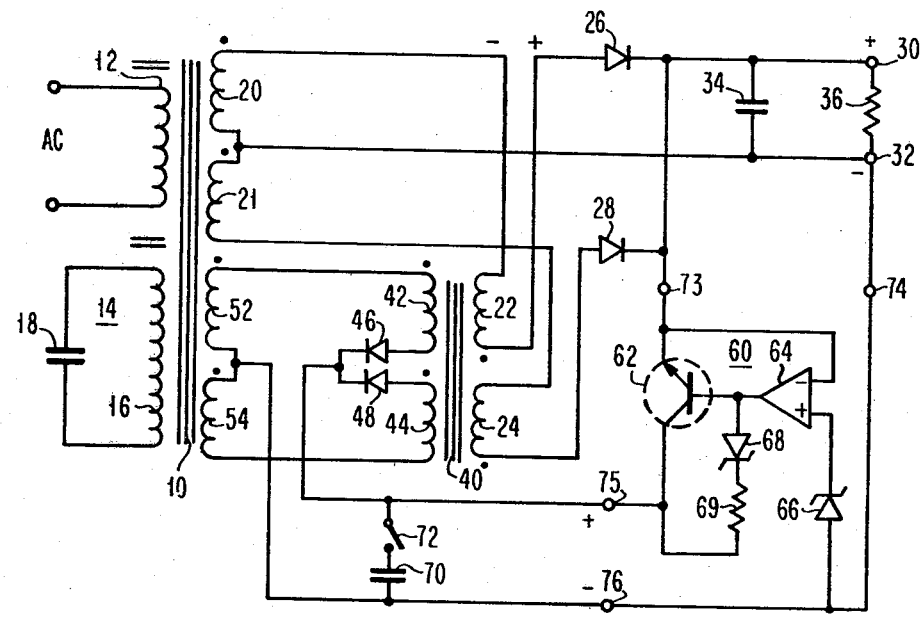
FIG. 1 is a schematic diagram of an enclosed loop compensating regulated power supply circuit arrangement according to the invention.

A ferroresonant power supply arrangement having a wide range of tight control of the output potential is shown in the schematic diagram of FIG. 1. A ferroresonant transformer 10 has the usual primary winding 12 and a resonating circuit 14 comprising the inductance of a winding 16 and the capacitance of a capacitor 18. A pair of principal power supply secondary windings 20, 21 have the terminals of opposite polarity thereof connected by way of windings 22 and 24 to rectifying diodes 26 and 28 which are tied together in full wave rectifier configuration to the positive output terminal 30 with the other terminals of the windings connected to the negative output terminal 32. Either output terminal may be connected to ground or any one other point in the circuit may be grounded. A smoothing capacitor 34 is shunted across the output terminals 30 and 32 to which the load is connected. The windings 22 and 24 are compensating windings of a compensating transformer 40 having exciting windings 42 and 44 which are alternatively interposed in the circuit due to the action of a pair of rectifying diodes 46 and 48. The power for the compensating transformer 40 is obtained from secondary windings 52 and 54 of the power supply transformer 10.

The windings 22 and 24 are compensating potential supply windings for boosting or bucking the ac potential at the terminals of the windings 20, 21. The amount of boost and/or buck, or balance, is determined by a compensation control circuit 60. This circuit comprises a transistor 62 having the collector-emitter circuit thereof connected in series between the positive potential terminal 30 and the cathode electrodes of the diodes 46 and 48. The common connection between the windings 52 and 54 is connected directly to the negative supply terminal 32. The circuit is therefore completed by the load 36 and substantially all, or at least the great majority, of the current flowing in the control circuitry flows through the load 36. Variation in output potential is detected by a differential amplifying circuit 64 which compares the output potential against a reference potential established by a zener diode 66. Another zener diode 68 and a resistor 69 are connected in series across the base and collector electrodes of the transistor 62. These components are given values for preventing saturation of the core of the compensating transformer 40 in the bucking mode wherein otherwise it is possible that the potentials at the transistors might rise to values resulting in saturation. While a smoothing capacitor 70 is contemplated for maintaining a minimum potential across the terminals 75-76 for insuring operation with a full wave ac-dc power rectifying circuit by closing a switch 72 as shown, it has been found that substantially zero, or the very minimum of, capacitance in this portion of the circuit arrangement provides better operation of the circuitry according to the invention as will be discussed hereinafter.

Under steady state operating conditions, should a momentary load demand appear at the output terminals to cause the output potential to drop, a positive error signal is generated, amplified and applied to the base of the control transistor 62 which will tend to cause the transistor 62 to conduct more heavily and pass more current out through the load 36 and at the same time increase the potential across the winding 42. The higher potential on the winding 42 causes a larger potential across the compensating winding 22 which will force the output potential at the terminals 30, 32 to increase in order to meet the load demand. Should the load demand drop, the output potential will rise and a negative error signal will be generated. The operation will be substantially the same except for reversal of sign. This is closed loop regulation, and normally the circuit will hover about the normal output potential value.

The circuit arrangement according to the invention is arranged for very fast response to variations in output potential. Inductance is reduced to a minimum, or substantially zero, in the output of the rectifying assembly 26,28 for this reason in contradistinction to prior art teaching. Likewise capacitance is reduced to a minimum across the exciting winding 42,44 so that the circuit arrangement responds rapidly to changes in load demand and/or higher harmonic component of any ripple frequency wave. Hence the capacitor 70 is better omitted. With minimum capacitance the positive going excursions of the wave are taken care of but not the negative going excursions. This would be less than desirable since the circuit theoretically could lose regulation of the notch in the full wave rectified ac waveform, but the increased speed of response appears to compensate fully in all cases.

Preferably, the power supply components are designed so that the principal power supply transformer windings 20, 21 provide the minimum output voltage desired and the compensating windings to transformer 40 are designed to boost the potential applied to the rectifier diodes 26, 28 sufficiently to provide the desired output potential adjustment range. This arrangement then also reduces distributional losses and thermal drift effects.

For a power supply designed for delivering a low potential at a high current the transformer 40 is designed to have a step down ratio from the windings 42, 44 to the winding 22, 24 whereby a significant amount of current gain obtains. This is accomplished by having the compensating potential from the power supply winding 52 of significantly higher value than the maximum potential developed across the winding 22, 24 as required to handle the range of regulation desired. By relegating this current gain to the transformer 40, the current conducted through the transistor 62 is reduced and the system efficiency is thereby improved.

Figure 2:
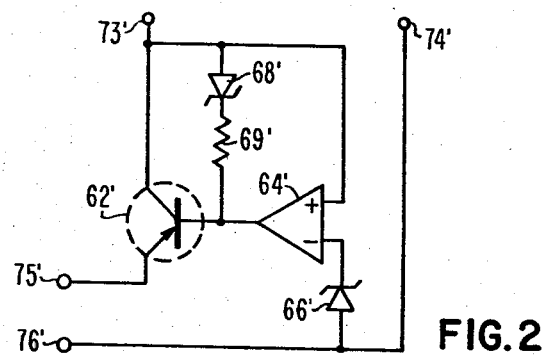
FIG. 2 is a schematic diagram of a portion of the circuit arrangement for use in an alternate embodiment of the arrangement according to the invention.

If desired, a pnp transistor 62' is used as shown in FIG. 2 which details only that part of the circuit between terminals 73, 74, 75 and 76. The other components of the circuitry remain substantially the same. Another alternative arrangement contemplated is that of tapping the principal power supply secondary windings whereby the power for both the load circuitry (36), the control circuit 60 and the compensating transformer 40 are obtained from the single pair of secondary windings. The tapping is made at the proper potential levels for the two subcircuits; the current rating of course must be sufficient to supply all of the power required with this alternative arrangement. Also the exciting windings 42 and 44 are alternatively connected as a centertapped winding and the diodes 46, 48 moved to the outer ends of this centertapped winding connected to the windings 52,54 on the power transformer 10. Those skilled in the art will make the substitutions and adapt the values in known manner.

The circuit arrangement, according to the invention, is not dependent on the use of a ferroresonant transformer, but the use of such a transformer affords excellent regulation of variations in the ac power line, which is one of the principal advantages of the ferroresonant transformer. The circuit arrangement according to the invention does not interact with the tuned tank circuit of the ferroresonant transformer as is the case with some prior art arrangements, and therefore tank circuit 14 is tuned to the power line frequency for optimum line regulation by the ferroresonant transformer. Then the circuit arrangement according to the invention is designed for optimum regulation of the dc output potential which is subject to variation due to variations in the load 36 which affect the output potential of the rectifier assembly. Power obtained from a conventional ac power line is applied to the primary winding 12 and line regulated alternating potential is induced in secondary windings 20, 21, and 52, 54. The potential drops across all of the rectifier diodes 26, 28 and 46, 48 are neglected in this discussion for clarity whereby potential across the exciting winding 42, for example, is equal to the potential across the supply winding 52 less the voltage across the terminal 75 and 76. For ease in understanding, assume that the switch 72 is closed and the potential is stored in the capacitor 70. The potential across the winding 42 is then transformed through the winding 22. The potential across the winding 22 is therefore $$E_{22} = (E_B - E_C)(N_T/N_C) \tag{1}$$

Where $E_B$ is effective potential the power supply across either of secondary windings 52, 54, in volts.

$E_C$ is the effective potential across the terminals 75 and 76 in volts;

$N_T$ is the number of turns of the winding 22, 24; and $N_C$ is the number of turns of the input winding 42, 44.

By virtue of the polarity therefore, the output potential in volts is $$E_O = E_S + (E_B - E_C)N_T/N_C \tag{2}$$

Where $E_O$ is the regulated output potential at terminals 30, 32 in volts; and $E_S$ is the effective potential in volts across either of the principal power supply secondary windings 20, 21.

This equation (2) reveals that if $E_C$ is reduced, $E_O$ will rise; and if $E_C$ is increased, $E_O$ will drop. Linear control of $E_O$ obtains over the range:

$$E_S + E_B(N_T/N_C) \tag{3}$$

to $E_{Es} - (E_{Cmax} - E_B)N_T/N_C$ (4)

Where $E_{Cmax}$ is limited by the amount of iron in the core of the compensating transformer 40.

Figure 3:
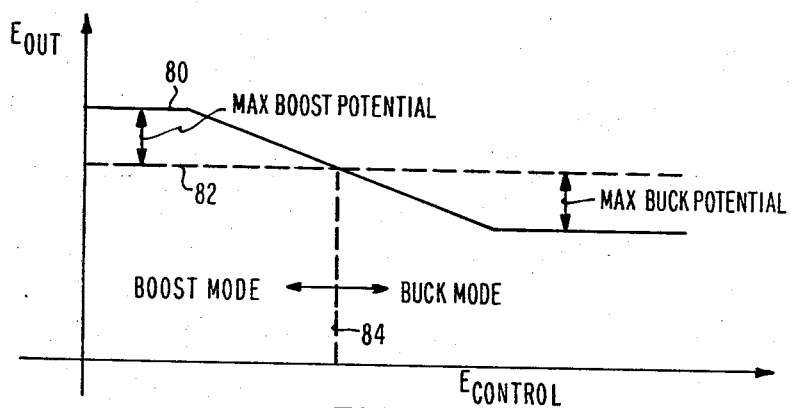
FIG. 3 is a graphical representation of the variable compensating potential of an electric power supply according to the invention.

A graphical representation of waveform helpful in the understanding of the operation of the circuitry according to the invention is given in FIG. 3. A curve 80 represents the actual output potential across the load at a given instant as against the regulated output potential desired which is represented by the curve 82. The zero crossover between bucking and boosting modes of operation appears at the line 84. Once the circuit arrangement is operating it will tend to hover about the crossover point at the line 84 but without hunting.

Figure 4:
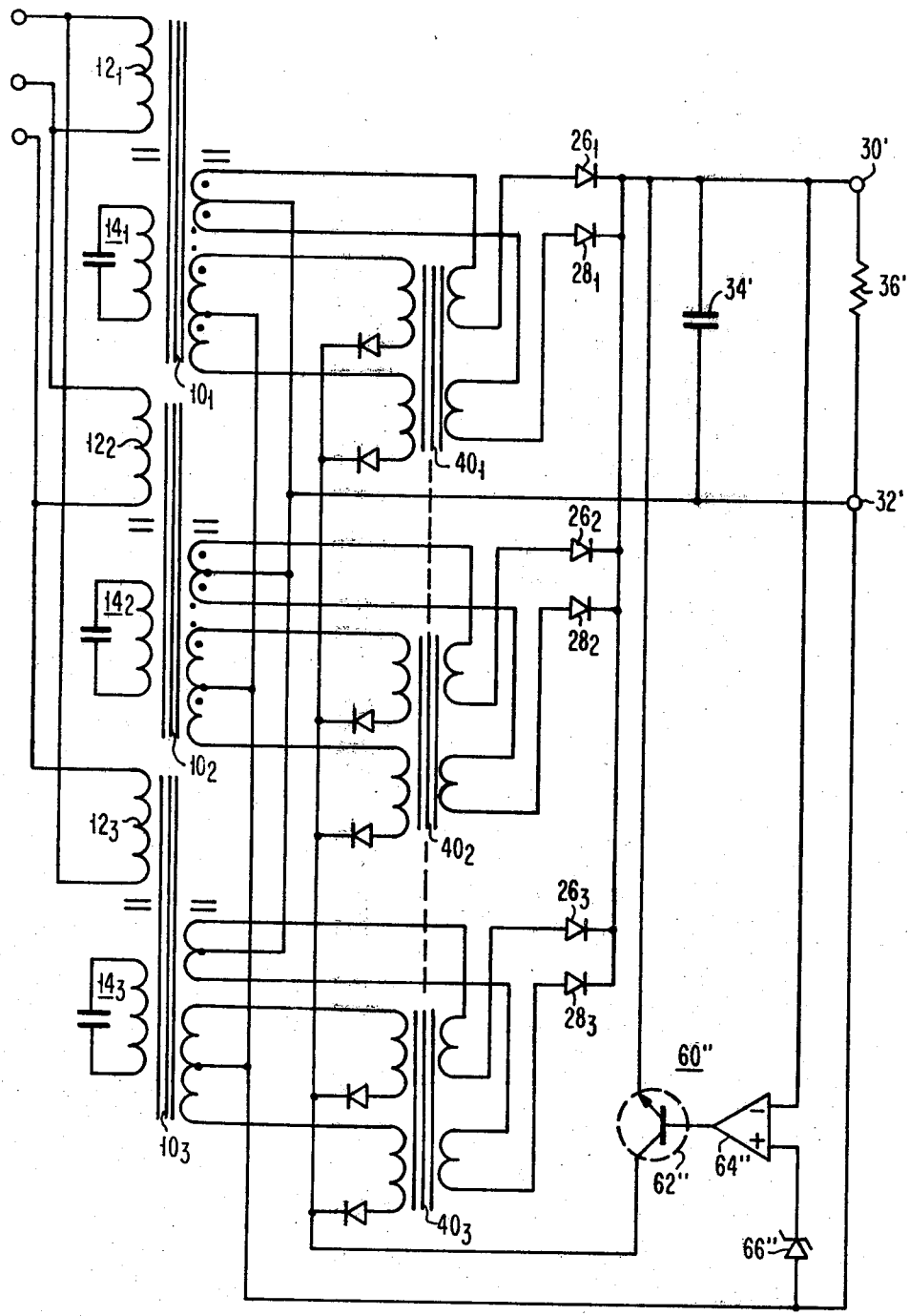
FIG. 4 is a schematic diagram of an alternate embodiment of the invention for operation on three phase ac electric power.

The circuit arrangement according to the invention is readily adaptable to polyphase power supply circuit arrangements. An example of a three-phase power supply arrangement is given in FIG. 4. In essence three single phase power supplies are operated at phase intervals of 120° insofar as the primary windings are concerned, and the secondary windings feed three rectifier assemblies $26_1-28_1 \ldots 26_3-28_3$ whose output anode connections are tied in parallel to the positive output terminal 30. A power supply according to the invention built along the lines of FIG. 4 delivered 5 volts dc at 120 amperes average. This potential was held within ±0.5% over a current range of 80 to 150 amperes. A single control circuit 60' serves all three power component supplies as shown. The same advantages obtain with the polyphase power supply circuit arrangement as for the single phase circuit arrangement previously described, and there is an additional advantage inherent in the overlapping conduction of the rectifier assemblies which maintains a higher minimum potential in the auxiliary power supply circuit without any additional capacitor. The transformers $10_1 \ldots 10_3$ and $40_1 \ldots 40_3$ may be individual core arrangements for one-third of the power requirements. The capacitor 34' need be but one-fifth the value of prior art power supplies.

While the invention has been described in terms of express embodiments and alternative arrangements have been suggested, it clearly should be understood that those skilled in the art will make changes as required for the application at hand without departing from the spirit and scope of the invention as defined in the appended claims concluding the specification.

The invention claimed is:

1. A closed loop potential regulated power supply circuit arrangement comprising
    a power transformer having a primary winding, a principal power supply secondary winding and an auxiliary power supply secondary winding,
    a rectifier assembly coupled to said principal power supply secondary winding,
    an electric load connected to said rectifier assembly,
    a compensating potential transformer having an exciting winding and having a pair of compensating windings individually interposed between the terminals of said principal power supply secondary winding and said rectifier assembly, a rectifying assembly, control circuitry having an input circuit connected directly across said rectifier assembly and having an output circuit connected across a series circuit including said exciting winding, said rectifying assembly and said auxiliary power supply secondary winding, characterized in that said control circuitry comprises:

a transistor device having a base electrode, and having a collector-emitter electrode circuit connected in series between said rectifier assembly and one terminal of said series circuit, control amplifier circuitry having an input circuit connected across said electric load and having an output circuit connected between said base electrode of said transistor device and said series circuit, and reference voltage device interposed in said input circuit of said control amplifier circuitry.

2. A closed loop potential regulated power supply circuit arrangement comprising a power transformer having a primary winding, a pair of principal power supply secondary windings and a pair of compensating power supply secondary windings, a full wave rectifier assembly coupled to said principal power supply secondary windings, an electric load circuit connected to said rectifier assembly, a compensating potential transformer having a pair of exciting windings and having a pair of compensating windings individually interposed between the terminals of said principal power supply secondary windings and said full wave rectifier assembly, a pair of diode rectifiers, compensating control circuitry having an input circuit connected across said load circuit and having an output circuit connected across a series circuit including said exciting windings, said rectifiers and said compensating power supply secondary windings, and characterized in that said control circuitry comprises:

a transistor having a base electrode, and having a collector-base electrode circuit connected in series between said full wave rectifier assembly and said pair of diode rectifiers of said series circuit, a reference voltage diode, and differential amplifier circuitry having one input terminal connected to said rectifier assembly, another input terminal connected to said reference voltage diode, and having an output terminal connected to said base electrode of said transistor.

3. A closed loop potential regulated power supply circuit arrangement as defined in claim 2, and wherein said reference voltage diode is a zener diode.

4. A closed loop potential regulated power supply circuit arrangement as defined in claim 2, and incorporating a capacitor connected across said series circuit including one of said diode rectifiers, one of said exciting windings of said compensating transformer, and one of said compensating secondary windings of said power supply transformer.

5. A closed loop potential regulated power supply circuit arrangement as defined in claim 2 and incorporating another zener diode and a resistor connected across the base and the collector electrodes of said transistor.

6. A closed loop potential regulated power supply circuit arrangement as defined in claim 2, and wherein said transistor is a pnp type transistor.

7. A closed loop potential regulated power supply circuit arrangement as defined in claim 2, and wherein said transistor is an npn type transistor.

8. A closed loop potential regulated power supply circuit arrangement as defined claim 2, and incorporating two additional components each of said ferroresonant power transformer, said full wave rectifier assembly, said pair of diode rectifiers and said transformer interconnected as defined, and connected in parallel to said power supply circuit as defined for operation on a three-phase ac power source.

9. A closed loop potential regulated power supply circuit arrangement as defined in claim 2, and wherein said principal power supply secondary winding is arranged to deliver the output potential required for the application at hand, and said compensating winding is arranged to provide the algabraic difference in potential required for the range of potential adjustment.

10. A closed loop potential regulated power supply circuit arrangement as defined in claim 2, and wherein variation in the compensating potential is achieved by varying the direct current component in said exciting winding.

11. A closed loop potential regulated power supply circuit arrangement as defined in claim 2, and wherein said transistor is connected into said circuit arrangement for current flow through said electric load.

12. A closed loop potential regulated power supply circuit arrangement as defined in claim 2, and wherein said transistor is connected in a common emitter configuration.

13. A closed loop potential regulated power supply circuit arrangement as defined in claim 2, and wherein said transistor is connected in a common collector configuration.

14. A closed loop potential regulated power supply circuit arrangement as defined in claim 2, and wherein said circuit arrangement has substantially zero inductive reactance in the circuitry connected to said rectifier assembly.

15. A closed loop potential regulated power supply circuit arrangement as defined in claim 2, and wherein said circuit arrangement has substantially zero capacitive reactance across said exciting windings.

16. A closed loop potential regulated power supply circuit arrangement as defined in claim 2, and wherein said circuit arrangement is operable for a continuous range of operation through a boosting mode, a balance mode, and a bucking mode.

17. A closed loop potential regulated power supply circuit arrangement as defined in claim 16, and wherein said circuit substantially hovers in said balance mode.

18. A closed loop potential regulated power supply circuit arrangement comprising a ferroresonant power transformer having a primary winding, a resonating winding, a pair of principal power supply secondary windings and a pair of auxiliary power supply secondary windings, a capacitor connected in parallel with said resonating winding, a rectifier-and-capacitive-filter assembly coupled to said principal power supply secondary windings, an electric load circuit connected to said assembly, a compensating potential transformer having an exciting winding and having a pair of compensating windings individually interposed between the terminals of said principal power supply secondary windings and said rectifier-and-capacitive-filter assembly, a rectifying assembly, control circuitry having an input circuit connected across said load circuit and having an output circuit connected across a series circuit including said exciting windings, said rectifier assembly and said auxiliary power supply secondary windings, characterized in that said control circuitry comprises:

a transistor device having a base electrode, and having a collector-emitter electrode circuit connected in series directly between said rectifier-and-capacitive-filter assembly and said rectifying assembly of said series circuit, control differential amplifier circuitry having an input circuit connected across said load circuit and having an output circuit connected to said base electrode of said transistor device, and a reference voltage device interposed in said input circuit of said control amplifier circuitry.

19. A closed loop potential regulated power supply circuit arrangement as defined in claim 18, and wherein said ferroresonant transformer is tuned to the frequency of the current flowing in said primary winding independently of said compensating control circuitry.

20. A full wave potential regulated power supply circuit arrangement comprising a power transformer having a primary winding, having a pair of principal power supply secondary windings and having a pair of compensating power supply secondary windings, a compensating potential transformer having a pair of exciting windings and having a pair of compensating windings, and pairs of interconnected components completing closed electric halfwave rectifying loops having two electric connections in common, each of said loops including an electric connection between one terminal of one of said principal power supply secondary windings and one terminal of one of said compensating windings, a rectifier element having one terminal connected to the other terminal of said one compensating winding and having another terminal, a transistor having a base electrode and having a collector-emitter interelectrode path forming one of said common electric connections having one terminal thereof connected to said other terminal of said rectifier element, and having another terminal, a rectifying element having one terminal connected to the other terminal of said one common electric connection and having another terminal connected to one terminal of one of said exciting windings, an electric connection between the other terminal of said exciting winding and one terminal of one of said compensating power supply windings, differential amplifier circuitry having one input terminal connected to said other terminal of said rectifier element, having another input terminal, and having an output terminal connected to said base electrode of said transistor, a reference voltage diode having one terminal connected to said other input terminal of said differential amplifier circuitry and having another terminal connected in the other of said common connections to the other terminals of said principal power supply windings and said compensating power supply windings, and an electric load circuit connected between said common electric connections.

21. A full wave potential regulated power supply circuit arrangement comprising a power transformer having a primary winding, having a pair of principal power supply secondary windings and having a pair of compensating power supply secondary windings, a compensating potential transformer having a pair of exciting windings and having a pair of compensating windings, and a pair of closed electric halfwave rectifying loops having two electric connections in common, each of said loops including one of said principal power supply secondary windings, a rectifier element and one of said compensating windings connected in a first series circuit, a rectifying element, one of said exciting windings, and one of said compensating power supply windings connected in a second series circuit, a transistor having a base electrode and having a collector-emitter interelectrode path forming one of said common electric connections connected in series with said first and said second series circuits, said first and said second series circuits connected together in the other of said common connections, differential amplifier circuitry having one input terminal connected to said first series circuit, having another input terminal, and having an output terminal connected to said base electrode of said transistor, a reference voltage diode having one terminal connected to said other input terminal of said differential amplifier circuitry and having another terminal connected to said second series circuit, and an electric load circuit connected between said common electric connections.

* * * * *